United States Patent
Kang

(10) Patent No.: US 8,854,490 B2
(45) Date of Patent: Oct. 7, 2014

(54) METHOD AND APPARATUS FOR COMPENSATING A BLACK LEVEL OF AN IMAGE SIGNAL

(75) Inventor: Hwa-Yong Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 569 days.

(21) Appl. No.: 13/075,952

(22) Filed: Mar. 30, 2011

(65) Prior Publication Data

US 2011/0242353 A1 Oct. 6, 2011

(30) Foreign Application Priority Data

Mar. 30, 2010 (KR) .................. 10-2010-0028812

(51) Int. Cl.
*H04N 5/235* (2006.01)
*H04N 9/04* (2006.01)
*G09G 5/02* (2006.01)

(52) U.S. Cl.
USPC .............. 348/222.1; 348/207.99; 345/605

(58) Field of Classification Search
USPC .......... 348/222.1, 241–251, 207.99; 345/605
See application file for complete search history.

(56) References Cited

U.S. PATENT DOCUMENTS

| 2002/0135683 A1* | 9/2002 | Tamama et al. .............. 348/222 |
| 2004/0130625 A1* | 7/2004 | Imamura et al. ............. 348/185 |
| 2009/0141167 A1* | 6/2009 | Zhang et al. ................. 348/455 |
| 2009/0252412 A1* | 10/2009 | Matsushita .................. 382/167 |
| 2010/0091194 A1* | 4/2010 | Lei et al. ..................... 348/607 |
| 2010/0295991 A1* | 11/2010 | Yano et al. .................. 348/453 |
| 2011/0091101 A1* | 4/2011 | Cote et al. ................... 382/167 |

FOREIGN PATENT DOCUMENTS

| KR | 1020060108423 | 10/2006 |
| KR | 1020080022732 | 3/2008 |
| KR | 1020100027317 | 3/2010 |

* cited by examiner

*Primary Examiner* — Trung Diep
(74) *Attorney, Agent, or Firm* — The Farrell Law Firm, P.C.

(57) ABSTRACT

A method and an apparatus for compensating a black level are provided, in which an image signal processor converts an input image signal into an image signal at YUV color coordinates so that the image signal at the YUV color coordinates is in a first signal range, and a black level compensator compensates a Y component of the image signal at the YUV color coordinates so that the Y component of the image signal at the YUV color coordinates are in a second signal range narrower than the first signal range or maintains the Y component of the image signal at the YUV color coordinates in the first signal range, according to a type of an external image output device.

9 Claims, 6 Drawing Sheets
(3 of 6 Drawing Sheet(s) Filed in Color)

METHOD AND APPARATUS FOR COMPENSATING A BLACK LEVEL OF AN IMAGE SIGNAL

PRIORITY

This application claims priority under 35 U.S.C. §119(a) to a Korean Patent Application filed in the Korean Intellectual Property Office on Mar. 30, 2010 and assigned Serial No. 10-2010-0028812, the contents of which are incorporated herein by reference.

BACKGROUND OF THE INVENTION

1. Field of the Invention

The present invention relates generally to an apparatus and method for outputting an image, and more particularly, to an apparatus and method for compensating the black level of an image signal, prior to transmission to an external image output device.

2. Description of the Related Art

When a captured image of an object is converted into an image signal, color coordinates such as Red, Green, Blue (RGB), Cyan, Magenta, Yellow (CMY), Hue Saturation, Intensity (HSI), YUV, and YCbCr are generally used to represent standard colors.

The RGB color system represents an image using three primary colors of light, that is, red, green and blue signals. An image signal at RGB color coordinates is typically used for an image output device such as a Cathode Ray Tube (CRT) or a Liquid Crystal Display (LCD).

While RGB color coordinates have information about primary color signals, YUV color coordinates have information about chrominance signals. Y denotes luminance, U equals B−Y, and V equals R−Y (i.e. U=B−Y, V=R−Y).

YCbCr color coordinates are a digital representation of YUV color coordinates and are usually employed to represent Standard Definition (SD) or High Definition (HD) Television (TV) images or to compress Joint Photographic Experts Group (JPEG) images. In YCbCr, Cb corresponds to U of YUV and Cr corresponds to V. The YCbCr standard is defined in International Telecommunication Union (ITU) R BT. 601 (SD) and ITU R BT. 709(HD). The YUV color coordinates including the YCbCr color coordinates are based on the principle that the eyes are most sensitive to light intensity. The YUV color coordinates advantageously decrease the total data amount of an image signal by appropriately maintaining a data amount allocated to the Y component and reducing a data amount allocated to the U or V component to which the eyes are insensitive.

Camcorders are generally tuned to two available signal ranges. Specifically, one type of camcorder creates images for a TV, a monitor, or broadcasting in compliance with a standard, whereas the other type of camcorder is tuned without complying with a standard, considering a Personal Computer (PC)-using environment, so that a high-quality image may be output through a PC.

The former type of camcorder complies mainly with ITU R BT.601(SD) and ITU R BT.709(HD). According these standards, the signal range of an image signal is expressed in 8 bits, ranging from 16 to 235. The upper bound may be set to exceed 235.

The image signal range of the latter type of camcorder is an 8-bit full range from 0 to 255.

A created image may be output to an external image output device, that is, a display in two manners.

One such manner is to directly output an image to, for example, a TV or a monitor. An 8-bit Y component of 16 in a YUV signal is mapped to 0 in the RGB color system. That is, YUV color coordinates are converted into RGB color coordinates by Equation (1) (ITU R BT.601) and Equation (2) (ITU R BT.709), as follows.

$$\begin{bmatrix} Y'_{601} \\ C_B \\ C_R \end{bmatrix} = \begin{bmatrix} 16 \\ 128 \\ 128 \end{bmatrix} + \begin{bmatrix} 65.481 & 128.553 & 24.966 \\ -37.797 & -74.203 & 112 \\ 112 & -93.786 & -18.214 \end{bmatrix} \times \begin{bmatrix} R' \\ G' \\ B' \end{bmatrix} \quad (1)$$

$$\begin{bmatrix} Y'_{709} \\ C_B \\ C_R \end{bmatrix} = \begin{bmatrix} 16 \\ 128 \\ 128 \end{bmatrix} + \begin{bmatrix} 46.559 & 156.629 & 15.812 \\ -25.664 & -86.336 & 112 \\ 112 & -101.730 & -10.270 \end{bmatrix} \times \begin{bmatrix} R' \\ G' \\ B' \end{bmatrix} \quad (2)$$

The other manner is to map an 8-bit YUV signal to an RGB signal without changing a luminance of 16, for use in a display of a PC.

FIGS. 1A to 2B compare an image captured by a camcorder (FIGS. 1A and 1B) complying with a standard and displayed on a TV (FIG. 1A) and a PC (FIG. 1B) with an image captured by a camcorder (FIGS. 2A and 2B) that does not comply with a standard and displayed on a TV (FIG. 2A) and a PC (FIG. 2B), in terms of image quality, according to the prior art.

Referring to FIGS. 1A and 1B, when an image captured by the camcorder complying with a standard is directly output to a TV or a monitor (FIG. 1A), the black level of the image is maintained as normal without quality degradation. However, if the image is output to a PC (FIG. 1B), the black level is higher than it actually is and thus a screen is brighter than normal. In addition, contrast decreases, thereby degrading video quality. The black level is the brightness level of the darkest (black) part of an image.

Referring to FIGS. 2A and 2B, when an image captured by the camcorder not complying with a standard is output to a PC (FIG. 2B), the black level of the image is maintained as normal without quality degradation. However, if the image is output directly to a TV or a monitor (FIG. 2A), clipping occurs to a dark part of the image, thereby make it very difficult to identify an image.

SUMMARY OF THE INVENTION

An aspect of embodiments of the present invention is to address at least the problems and/or disadvantages and to provide at least the advantages described below. Accordingly, an aspect of embodiments of the present invention is to provide a method and apparatus for acquiring excellent image quality by compensating a black level according to the environment of an external image output device, when an image capturing apparatus such as a camera, a camcorder or a webcam outputs an image to the external image output device.

In accordance with an embodiment of the present invention, there is provided an apparatus for compensating a black level, in which an image signal processor converts an input image signal into an image signal at YUV color coordinates so that a Y component of the image signal at the YUV color coordinates is in a first signal range, and a black level compensator compensates the Y component of the image signal at the YUV color coordinates so that the Y component of the image signal at the YUV color coordinates is in a second signal range narrower than the first signal range or maintains the Y component of the image signal at the YUV color coordinates in the first signal range, according to a type of an external image output device.

If the external image output device is a High Definition Multimedia Interface (HDMI) device or a TV, the black level compensator may compensate the Y component of the image signal at the YUV color coordinates to have the second signal range and if the external image output device is not an HDMI device or a TV, the black level compensator may maintain the Y component of the image signal at the YUV color coordinates in the first signal range.

The apparatus may further include an output terminal for outputting the image signal at the YUV coordinates compensated by the black level compensator to the external image output device. The first signal range may be 0 to 255 and the second signal range may be 16 to 235.

If the external image output device is an HDMI device, the output terminal may simply output the image signal at the YUV coordinates received from the black level compensator to the external image output device. If the external image output device is not an HDMI device, the output terminal may convert the image signal at the YUV coordinates received from the black level compensator into an image signal at Red, Green, Blue (RGB) color coordinates and output the image signal at the RGB color coordinates to the external image output device.

In accordance with another embodiment of the present invention, there is provided an apparatus for compensating a black level, in which an image signal processor converts an input image signal into an image signal at YUV color coordinates so that a Y component of the image signal at the YUV color coordinates is in a first signal range, a black level compensator compensates the Y component of the image signal at the YUV color coordinates so that the Y component of the image signal at the YUV color coordinates is in a second signal range narrower than the first signal range or maintains the Y component of the image signal at the YUV color coordinates in the first signal range, according to a type of an external image output device, a memory stores the image signal at the YUV color coordinates compensated by the black level compensator, and an output terminal outputs the image signal at the YUV coordinates compensated by the black level compensator to the external image output device.

In accordance with a further embodiment of the present invention, there is provided a method for compensating a black level, in which an input image signal is converted into an image signal at YUV color coordinates so that a Y component of the image signal at the YUV color coordinates is in a first signal range, and the Y component of the image signal at the YUV color coordinates is compensated so that the Y component of the image signal at the YUV color coordinates is in a second signal range narrower than the first signal range, or maintained in the first signal range, according to a type of an external image output device.

The method may further include outputting the compensated image signal at the YUV coordinates to the external image output device. The first signal range may be 0 to 255 and the second signal range may be 16 to 235.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Figure 1A:
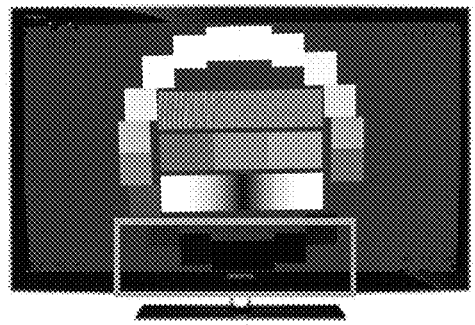
FIGS. 1A to 2B illustrate conventional image output results.
Figure 1B:
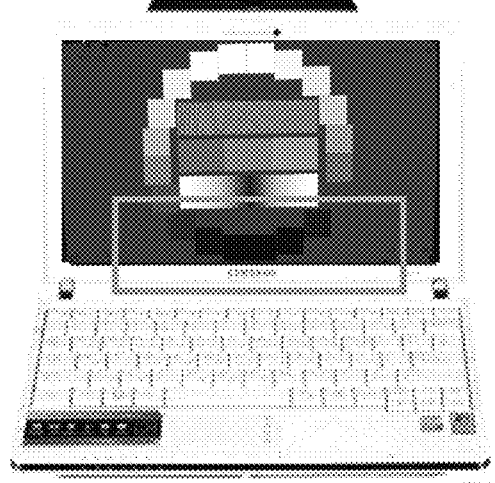
Figure 2A:
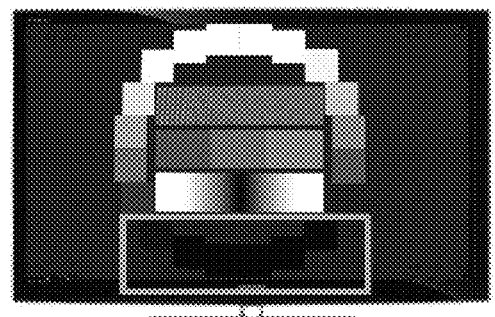
Figure 2B:
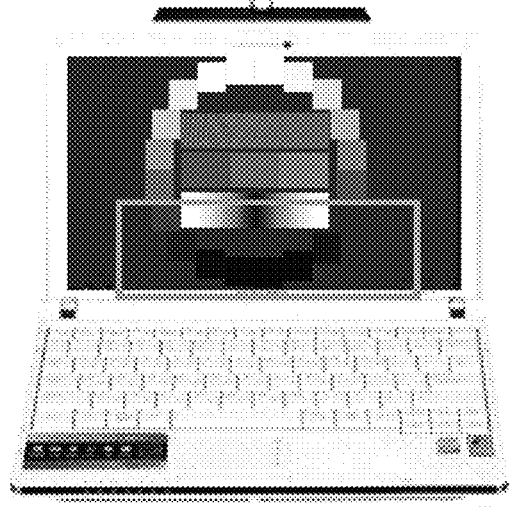
Figure 3:
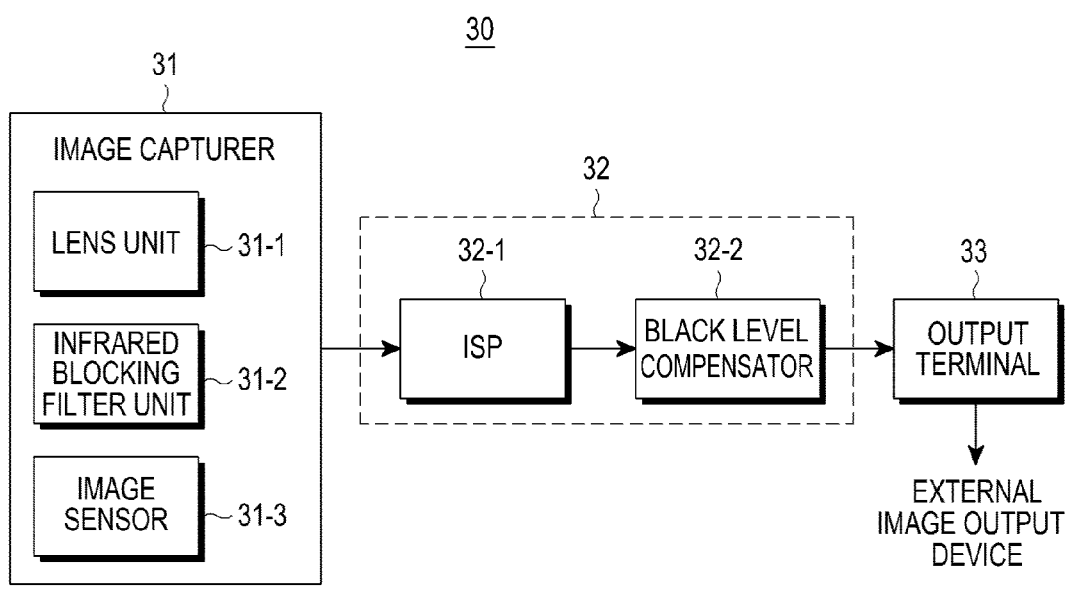
FIG. 3 illustrates a black level compensation apparatus and an image capturing apparatus according to an embodiment of the present invention.

FIG. 3 illustrates a black level compensation apparatus 32 according to an embodiment of the present invention.

Referring to FIG. 3, the black level compensation apparatus 32 includes an Image Signal Processor (ISP) 32-1 and a black level compensator 32-2. The ISP 32-1 converts an image signal at YUV color coordinates such that a Y component of the image signal is in a first signal range.

The black level compensator 32-2 maintains the Y component of the image signal at the YUV color coordinates in the first range or compensates the Y component of the image signal at the YUV color coordinates so that the Y component is in a second signal range narrower than the first signal range, according to the type of an external image output device.

The external image output device may be any display such as a TV, a broadcast monitor, a projector, or a PC. The black level compensator 32-2 selects the first or second signal range for the black level of the external image output device to be optimally maintained. An appropriate Y component range for each external image output device may be pre-listed in a look-up table, so that each time an external image output device is connected to the black level compensation apparatus 32, the look-up table may be referred to in order to determine a Y component range.

The black level compensator 32-2 may compensate the Y component according to the type of the external image output device so that the Y component is in an appropriate signal range. The type of the external image output device may be automatically determined or may be determined upon receipt of a command to identify the type of the external image output device from a user through a user interface (not shown).

In the present invention, if the external image output device is HDMI device or a TV, the black level compensator 32-2 compensates the Y component to fall into the second signal range. If the external image output device is neither an HDMI device nor a TV, the black level compensator 32-2 maintains the Y component in the first signal range. The first signal range is 0 to 255 (0-255) and the second signal range is 16 to 235 (16-235). An output terminal 33 may be further provided to output YUV color coordinates compensated by the black level compensator 32-2 to the external image output device.

That is, if the external image output device is an HDMI device or a TV, a Y component range in which the black level of the external image output device is optimally maintained is determined to be (16-235) and then the range of the Y component is compensated to have the determined range. If the external image output device is neither an HDMI device nor a TV, a Y component range in which the black level of the external image output device is optimally maintained is determined to be (0-255) and thus the range of the Y component is maintained without compensation.

A Y component in the first signal range (0-255) is compensated into a Y component in the second signal range (16-235) by Equation (3).

$$Y = 16 + \frac{219}{255} \times Y' \qquad (3)$$

where Y' denotes a Y component at YUV color coordinates converted by the image signal processor 32-1 and Y denotes a Y component compensated to fall into the range of (0-235) by the black level compensator 32-2. That is, Equation (3) means that the full range of (0-255) is scaled down to "0-1", extended to a signal range of "0-219", and then shifted in parallel by "16".

In summary, if the external image output device is an HDMI device or a TV, the black level compensator 32-2 compensates an input image signal such that the Y component of the image signal is in the signal range of (16-235) and the U and V components of the image signal is in a signal range of (16-240). If the external image output device is neither an HDMI device nor a TV, the black level compensator 32-2 does not compensate an input image signal such that the Y component of the image signal is in the signal range of (0-255) and the U and V components of the image signal is in the signal range of (16-240).

The black level compensation apparatus 32 may further include the output terminal 33 for outputting YUV color coordinates having a compensated or non-compensated Y component to the external image output device, so that the YUV color coordinates is graphically represented.

As its appellation implies, an HDMI refers to a high-definition multimedia interface that enables transmission of digital video and audio signals without compression. The HDMI includes an HDMI connector and an HDMI plug. The HDMI connector and the HDMI plug are provided separately, for example, in a digital TV and a set-top box or in a digital TV and a DVD player in order to enable uni-directional or bi-directional signal transmission.

According to an embodiment of the present invention, if the external image output device is an HDMI device, the output terminal 33 of the black level compensation apparatus 32 simply outputs an image signal at YUV color coordinates received from the black level compensator 32-2 to the external image output device. If the external image output device is not an HDMI device, the output terminal 33 converts an image signal at YUV color coordinates received from the black level compensator 32-2 into an image signal at RGB color coordinates and outputs the image signal at the RGB color coordinates to the external image output device.

That is, an HDMI device can receive a YUV image signal and graphically display the YUV image signal. Therefore, if the external image output device is an HDMI device, the output terminal 33 outputs a YUV image signal to the external image output device without any additional conversion. If the external image output device is not an HDMI device, it cannot reproduce a YUV image signal. Rather, the external image output device reproduces an RGB image signal. Therefore, the output terminal 33 converts an image signal at YUV color coordinates received from the black level compensator 32-2 into an image signal at RGB color coordinates.

A description will now be given of a method for converting an image signal at YUV color coordinates to an image signal at RGB color coordinates in the output terminal 33.

If the external image output device is a TV, the output terminal 33 calculates integer parameters $D'_R$, $D'_G$ and $D'_B$ from a YUV image signal received from the black level compensator 32-2 by Equation (4).

$$Y = INT[0.2126 D'_R + 0.7152 D'_G + 0.0722 D'_B] \qquad (4)$$

$$Cb = INT\left[\left(-\frac{0.2126}{1.8556} D'_R - \frac{0.7152}{1.8556} D'_G + \frac{0.9278}{1.8556} D'_B\right) \cdot \frac{224}{219} + 2^{n-1}\right]$$

$$Cr = INT\left[\left(\frac{0.7874}{1.5748} D'_R - \frac{0.7152}{1.5748} D'_G - \frac{0.0722}{1.5748} D'_B\right) \cdot \frac{224}{219} + 2^{n-1}\right]$$

where the function INT[ ] represents the largest integer smaller than the number in the bracket [ ] and n denotes a natural number. Thus INT[−3.14] is −4. After the integer parameters $D'_R$, $D'_G$ and $D'_B$ are calculated using Equation (4), parameters $E'_R$, $E'_G$ and $E'_B$ are calculated using Equation (5).

$$D'_R = INT[(219 \times E'_R + 16) \times 2^{n-8}]$$

$$D'_G = INT[(219 \times E'_G + 16) \times 2^{n-8}]$$

$$D'_B = INT[(219 \times E'_B + 16) \times 2^{n-8}] \qquad (5)$$

The output terminal 33 converts an image signal at YUV color coordinates into an image signal at RGB color coordinates by setting the parameters $E'_R$, $E'_G$ and $E'_B$ calculated using Equation (5) as R, G and B components, respectively and then outputs the image signal at the RGB color coordinates to the external image output device, herein a TV.

If the external image output device is neither an HDMI device nor a TV, the output terminal 33 calculates the integer parameters $D'_R$, $D'_G$ and $D'_B$ from a YUV image signal received from the black level compensator 32-2 by Equation 6).

$$Y = INT[0.2126 D'_R + 0.7152 D'_G + 0.0722 D'_B] \qquad (6)$$

$$Cb = INT\left[\left(-\frac{0.2126}{1.8556} D'_R - \frac{0.7152}{1.8556} D'_G + \frac{0.9278}{1.8556} D'_B\right) \cdot \frac{224}{255} + 2^{n-1}\right]$$

$$Cr = INT\left[\left(\frac{0.7874}{1.5748} D'_R - \frac{0.7152}{1.5748} D'_G - \frac{0.0722}{1.5748} D'_B\right) \cdot \frac{224}{255} + 2^{n-1}\right]$$

where n denotes a natural number. After the integer parameters $D'_R$, $D'_G$ and $D'_B$ are calculated using Equation (6), parameters $E'_R$, $E'_G$ and $E'_B$ are calculated using Equation (7).

$$D'_R = INT[255 \times E'_R \times 2^{n-8}]$$

$$D'_G = INT[255 \times E'_G \times 2^{n-8}]$$

$$D'_B = INT[255 \times E'_B \times 2^{n-8}] \qquad (7)$$

where n denotes a natural number.

The output terminal 33 converts an image signal of YUV color coordinates to an image signal of RGB color coordinates by setting the parameters $E'_R$, $E'_G$ and $E'_B$ calculated using Equation (7) as R, G and B components, respectively and then outputs the image signal of the RGB color coordinates to the external image output device.

Referring to FIG. 3, the image capturing apparatus 30 according to an embodiment of the present invention includes an image capturer 31, the ISP 32-1, the black level compensator 32-2, and the output terminal 33. The image capturing apparatus 30 can advantageously acquire an image having excellent image quality by appropriately compensating a black level according to the display environment of the user, when outputting an image to various external image output devices connected to the image capturing apparatus 30.

More specifically, the image capturer 31 includes a lens unit 31-1, an infrared blocking filter unit 31-2, and an image sensor 31-3.

The lens unit 31-1 includes a plurality of lenses. Each of the lenses has rotational symmetry with respect to an optical axis and the optical axes of the lenses are arranged upon an axis. The lenses are spherical or non-spherical. The lens unit 31-1 may include three plastic lenses.

The infrared blocking filter unit 31-2 blocks incident light in an infrared band to which the human eyes are not sensitive. The image sensor 31-3 is sensitive to incident light in an infrared band (i.e. a light ray with a wavelength of about 750 nm or longer), which is not perceivable to the human eye. Therefore, an image of an object captured by the image sensor 31-3 is different from the natural color of the object due to the incident infrared light. Accordingly, the infrared block filter unit 31-2 is used to block the incident infrared light.

The image sensor 31-3 is configured in a matrix with N×M identical pixels. A Charge-Coupled Device (CCD) or a Complementary Metal-Oxide Semiconductor (CMOS) may be used as the image sensor 31-3. The image sensor 31-3 stores information that has passed through three primary color filters before the image sensor 31-3 and creates a color image by combining the stored information with contrast information stored in the image sensor 31-3.

That is, the image capturer 31 captures an object, converts the captured image to an image signal such as RGB color coordinates, and transmits the converted image signal to the ISP 32-1.

The ISP 32-1 converts an electrical signal received from the image sensor 31-3 to an image signal. If the image sensor 31-3 is a CMOS, the ISP 32-1 can be implemented on a single chip. If the ISP 32-1 is extended in function, it may be arranged on a chip in the form of a Digital Signal Processor (DSP) and a System on Chip (SoC). The ISP 32-1 may be configured so as to perform a special function such as a tremor prevention function, or a low illuminance compensation function.

The ISP 32-1 converts an image signal at RGB color coordinates received from the image capturer 31 to an 8-bit image signal at YUV color coordinates, such that the Y component of the image signal is in the first signal range.

The black level compensator 32-2 compensates the Y component of the image signal at the YUB color coordinates to cause the Y component to be in the second signal range narrower than the first signal range or maintains the Y component in the first signal range.

The external image output device may be any of displays such as a TV, a broadcast monitor, a projector, and a PC. The first or second signal range is selected for a signal compensated by the black level compensator 32-2, so that the black level of the compensated signal is appropriately maintained in the selected signal range. An appropriate Y component range may be set for each external image output device in a look-up table and thus each time the black level compensation apparatus is connected to an external image output device, a signal range for the Y component may be determined, referring to the look-up table.

The black level compensator 32-2 may compensate the Y component to be in an appropriate signal range according to the type of an external image output device. The external image output device may be automatically determined or may be determined upon receipt of a command to identify the type of an external image output device from the user via a user interface (not shown).

In accordance with the embodiment of the present invention, in the image capturing apparatus 30, if the external image output device is an HDMI device or a TV, the black level compensator 32-2 compensates the Y component into the second signal range. If the external image output device is neither an HDMI device nor a TV, the black level compensator 32-2 maintains the Y component in the first signal range. The first signal range is 0 to 255 (0-255) and the second signal range is 16 to 235 (16-235). The image capturing apparatus 30 may further include the output terminal 33 for outputting the YUV color coordinates compensated by the black level compensator 32-2 to the external image output device.

That is, if the external image output device is an HDMI device or a TV, a Y component range in which the black level of the external image output device is optimally maintained is determined to be (16-235) and then the range of the Y component is compensated to have the determined range. If the external image output device is neither an HDMI device nor a TV, a Y component range in which the black level of the external image output device is maintained most appropriately is determined to be (0-255) and thus the range of the Y component is maintained without compensation.

The method for compensating a Y component in the first signal range (0-255) into a Y component in the second signal range (16-235) has been described with reference to Equation (3).

In summary, if the external image output device is an HDMI device or a TV, the black level compensator 32-2 compensates an input image signal such that the Y component of the image signal is in the signal range of (16-235) and the U and V components of the image signal are in a signal range of (16-240). If the external image output device is neither an HDMI device nor a TV, the black level compensator 32-2 does not compensate an input image signal such that the Y component of the image signal is in the signal range of (0-255) and the U and V components of the image signal are in the signal range of (16-240).

The image capturing apparatus 30 may further include the output terminal 33 for outputting YUV color coordinates having a compensated or non-compensated Y component to the external image output device, so that the YUV color coordinates are graphically represented.

The output terminal 33 outputs YUV color coordinates having a Y component compensated or non-compensated by the black level compensator 32-2 to the external image output device, so that the YUV color coordinates are graphically represented.

If the external image output device is an HDMI device, the output terminal 33 simply outputs an image signal at YUV color coordinates received from the black level compensator 32-2 to the external image output device. If the external image output device is not an HDMI device, the output terminal 33 converts an image signal at YUV color coordinates received from the black level compensator 32 into an image signal at RGB color coordinates and outputs the image signal at the RGB color coordinates to the external image output device.

That is, an HDMI device can receive a YUV image signal and graphically display the YUV image signal. Therefore, if the external image output device is an HDMI device, the output terminal 33 outputs a YUV image signal to the external image output device without any additional conversion. If the external image output device is not an HDMI device, it cannot reproduce a YUV image signal. Rather, the external image output device can reproduce an RGB image signal. Therefore, the output terminal 33 converts an image signal at YUV color coordinates received from the black level compensator 32-2 into an image signal at RGB color coordinates.

The method for converting an image signal at YUV color coordinates into an image signal at RGB color coordinates in the output terminal 33 has been described with reference to Equations (4) to (7).

Figure 4:
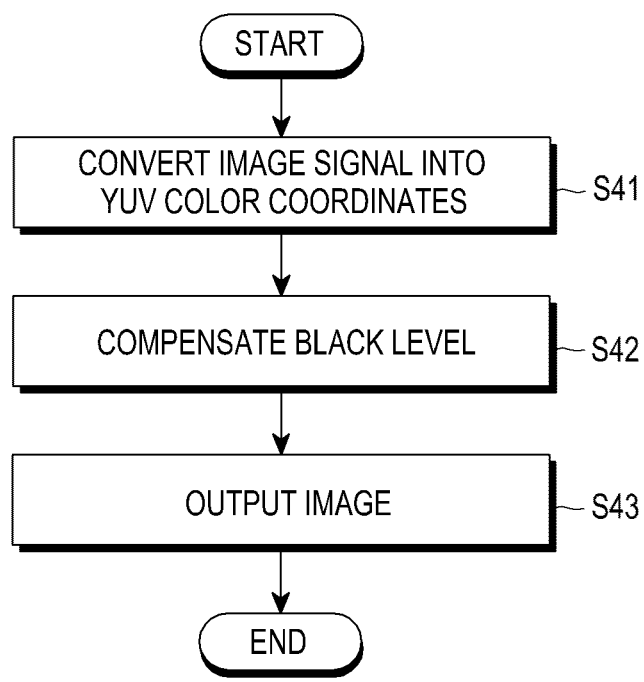
FIG. 4 illustrates a method for compensating a black level according to an embodiment of the present invention.

FIG. 4 illustrates a method for compensating a black level according to an embodiment of the present invention.

Referring to FIG. 4, the black level compensation method includes converting an input image signal into an image signal at YUV color coordinates such that the Y component of the image signal is in the first signal range in step S41, and compensating the Y component of the image signal at the YUV color coordinates to are in the second signal range narrower than the first signal range or maintaining the Y component of the image signal at the YUV color coordinates in the first signal range, according to the type of an external image output device in step S42.

Specifically, an input image signal is converted into an image signal at YUV color coordinates so that the Y component of the image signal is in the first signal range in step S41.

The Y component of the image signal at the YUV color coordinates is converted to have the second signal range narrower than the first signal range or maintained in the first signal range according to the type of an external image output device in step S42.

The external image output device may be any of displays such as a TV, a broadcast monitor, a projector, and a PC. The first or second signal range is selected for a signal compensated by the black level compensator 32-2, so that the black level of the compensated signal is appropriately maintained in the selected signal range. An appropriate Y component range may be set for each external image output device in a look-up table and thus each time the black level compensation apparatus is connected to an external image output device, a signal range for the Y component may be determined, referring to the look-up table.

The Y component may be compensated to be in an appropriate signal range according to the type of the external image output device in step S42. The external image output device may be automatically determined or may be determined upon receipt of a command to identify the type of an external image output device from the user via a user interface (not shown).

In the black level compensation method of FIG. 4, if the external image output device is an HDMI device or a TV, the Y component is compensated to fall into the second signal range in step S42. If the external image output device is neither an HDMI device nor a TV, the Y component is maintained in the first signal range in step S42. The first signal range is 0 to 255 (0-255) and the second signal range is 16 to 235 (16-235). The compensated YUV color coordinates are output to the external image output device in step S43.

That is, if the external image output device is an HDMI device or a TV, a Y component range in which the black level of the external image output device is optimally maintained is determined to be (16-235) and then the range of the Y component is compensated to have the determined range. If the external image output device is neither an HDMI device nor a TV, a Y component range in which the black level of the external image output device is optimally maintained is determined to be (0-255) and thus the range of the Y component is maintained without compensation.

The method for converting a Y component in the first signal range (0-255) into a Y component in the second signal range (16-235) has been previously described with reference to Equation (3).

That is, if the external image output device is an HDMI device or a TV, the Y component of the image signal is compensated to be in the signal range of (16-235) and the U and V components of the image signal are in a signal range of (16-240) in step S42. If the external image output device is neither an HDMI device nor a TV, the Y component of the image signal is in the signal range of (0-255) without compensation and the U and V components of the image signal are in the signal range of (16-240) in step S42.

If the external image output device is an HDMI device, the image signal at the YUV color coordinates compensated in step S42 is simply output to the external image output device in step S43. If the external image output device is not an HDMI device, the image signal at the YUV color coordinates compensated in step S42 is converted into an image signal at RGB color coordinates and output to the external image output device in step S43.

That is, an HDMI device can receive a YUV image signal and graphically display the YUV image signal. Therefore, if the external image output device is an HDMI device, a YUV image signal is simply output to the external image output device without any additional conversion. If the external image output device is not an HDMI device, it cannot reproduce a YUV image signal. Rather, the external image output device can reproduce an RGB image signal. Therefore, an image signal at YUV color coordinates is converted into an image signal at RGB color coordinates and then output to the external image output device.

The method for converting an image signal at YUV color coordinates into an image signal at RGB color coordinates in the output terminal 33 has been described with reference to Equations (4) to (7).

Figure 5:
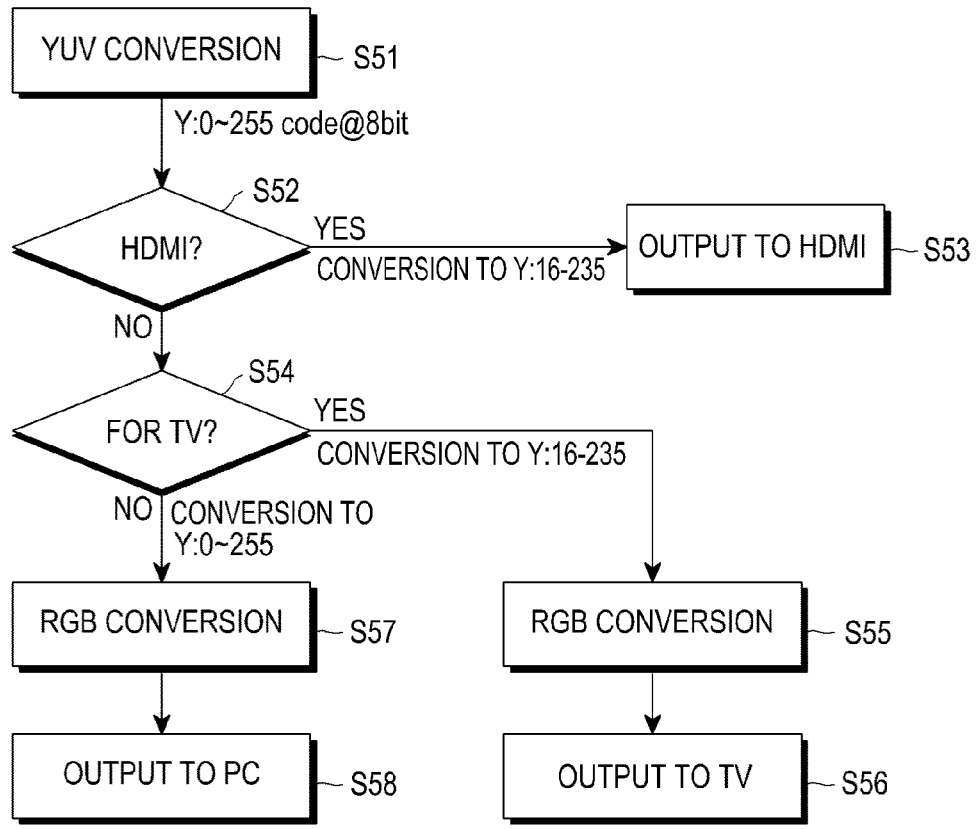
FIG. 5 illustrates a method for compensating a black level according to an embodiment of the present invention.

FIG. 5 illustrates a method for compensating a black level according to an embodiment of the present invention.

Referring to FIG. 5, an input image signal is first converted into an image signal at 8-bit YUV color coordinates in step S51. Herein, the Y component of the image signal is compensated into a signal range of (0-255), and the type of an external image output device, that is, the type of an image signal input terminal is determined in steps S52 and S54.

If the external image output device is an HDMI device, the signal range of the Y component is compensated into (16-235) and then output to the external image output device without conversion to RGB color coordinates in step S53. If the external image output device is a TV, the signal range of the Y component is compensated into (16-235), the image signal with the compensated Y component is converted into an image signal at RGB color coordinates in step S55, and then output to the external image output device, that is, the TV (S56). If the external image output device is neither an HDMI device nor a TV, the Y component is maintained in the signal range of (0-255), the image signal with the non-compensated Y component is converted into an image signal at RGB color coordinates in step S57, and then output to the external image output device, for example, a PC in step S58.

According to the embodiment illustrated in FIG. 5, an image having excellent image quality can be acquired by appropriately compensating a black level according to the display environment of a user, when an image is output to various connected external image output devices.

Figures 6A, 6B:
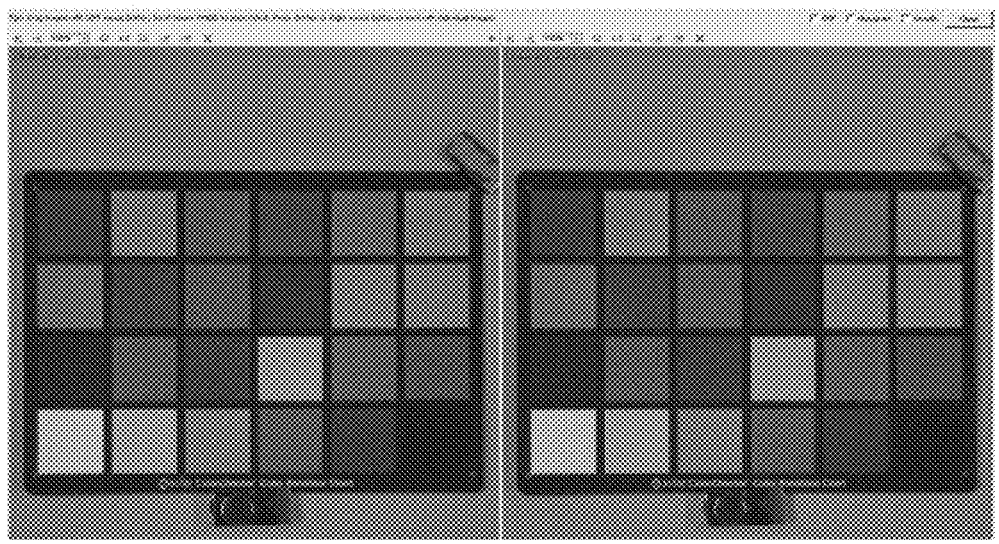
FIGS. 6A and 6B illustrate black level-compensated image output results according to the present invention.

FIGS. 6A and 6B illustrate black level-compensated image output results according to the present invention.

FIG. 6A illustrates a screen that displays a black level-compensated image signal on an HDMI device or a TV according to the present invention and FIG. 6B illustrates a screen that displays a black level-compensated image signal on a PC according to the present invention. A comparison between FIGS. 6A and 6B reveals that excellent image quality is maintained, unless a captured image of an object is too dark or too bright. That is, the conventional problem of image quality degradation caused by an inappropriate black level for an external image output device is significantly decreased.

As is apparent from the above description of the embodiments of the present invention, when an image is output to a variety of external image output devices, the black level of the image is compensated appropriately according to the display environment of a user, thus acquiring an output image with excellent image quality. Therefore, when the present invention is applied to a camcorder or a digital camera, image whitening or darkening caused by a black level not matching to an external image output device can be avoided.

While the invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. An apparatus for compensating a black level, comprising:
   an image signal processor for converting an input image signal into an image signal at YUV color coordinates so that a Y component of the image signal at the YUV color coordinates is in a first signal range; and
   a black level compensator for selecting, according to a type of an external image output device, a signal range for the Y component of the converted image signal, and compensating the Y component of the converted image according to the selected signal range,
   wherein compensating the Y component of the converted image signal according to the selected range includes compensating, if the external image output device is a first type of external image output device, the Y component of the converted image signal at the YUV color coordinates so that the compensated Y component of the converted image signal at the YUV color coordinates is in a second signal range narrower than the first signal range and maintaining, if the external image output device is a second type of image output device different from the first type, the Y component of the converted image signal at the YUV color coordinates in the first signal range.

2. The apparatus of claim 1, wherein if the external image output device is a High Definition Multimedia Interface (HDMI) device or a Television (TV), the black level compensator compensates the Y component of the image signal at the YUV color coordinates such that the Y component is in the second signal range, and if the external image output device is not an HDMI device or a TV, the black level compensator maintains the Y component of the image signal at the YUV color coordinates in the first signal range, further comprising an output terminal for outputting the image signal at the YUV coordinates compensated by the black level compensator to the external image output device,
   wherein the first signal range is 0 to 255 and the second signal range is 16 to 235.

3. The apparatus of claim 2, wherein if the external image output device is an HDMI device, the output terminal simply outputs the image signal at the YUV coordinates received from the black level compensator to the external image output device, and if the external image output device is not an HDMI device, the output terminal converts the image signal at the YUV coordinates received from the black level compensator into an image signal at Red, Green, Blue (RGB) color coordinates and outputs the image signal at the RGB color coordinates to the external image output device.

4. An apparatus for compensating a black level, comprising:
   an image signal processor for converting an input image signal into an image signal at YUV color coordinates so that a Y component of the image signal at the YUV color coordinates is in a first signal range;
   a black level compensator for selecting, according to a type of an external image output device, a signal range for the Y component of the converted image signal, and compensating the Y component of the converted image according to the selected signal range,
   wherein compensating the Y component of the converted image signal according to the selected range includes compensating, if the external image output device is a first type of external image output device, the Y component of the converted image signal at the YUV color coordinates so that the compensated Y component of the converted image signal at the YUV color coordinates is in a second signal range narrower than the first signal range, and maintaining, if the external image output device is a second type of image output device different from the first type, the Y component of the converted image signal at the YUV color coordinates in the first signal range;
   a memory for storing the image signal at the YUV color coordinates compensated by the black level compensator; and
   an output terminal for outputting the image signal at the YUV coordinates compensated by the black level compensator to the external image output device.

5. The apparatus of claim 4, wherein if the external image output device is a High Definition Multimedia Interface (HDMI) device or a Television (TV), the black level compensator compensates the Y component of the image signal at the YUV color coordinates such that the Y component is in the second signal range, and if the external image output device is not an HDMI device or a TV, the black level compensator maintains the Y component of the image signal at the YUV color coordinates in the first signal range, and
   wherein the first signal range is 0 to 255 and the second signal range is 16 to 235.

6. The apparatus of claim 5, wherein if the external image output device is an HDMI device, the output terminal outputs the image signal at the YUV coordinates received from the black level compensator to the external image output device, and if the external image output device is not an HDMI device, the output terminal converts the image signal at the YUV coordinates received from the black level compensator into an image signal at Red, Green, Blue (RGB) color coordinates and outputs the image signal at the RGB color coordinates to the external image output device.

7. A method for compensating a black level, comprising:
converting an input image signal into an image signal at YUV color coordinates so that a Y component of the image signal at the YUV color coordinates is in a first signal range;
selecting, according to a type of an external image output device, a signal range for the Y component of the converted image signal; and
compensating the Y component of the converted image according to the selected signal range,
wherein compensating the Y component of the converted image signal according to the selected range includes compensating, if the external image output device is a first type of external image output device, the Y component of the converted image signal at the YUV color coordinates so that the compensated Y component of the converted image signal at the YUV color coordinates is in a second signal range narrower than the first signal range, and maintaining, if the external image output device is a second type of image output device different from the first type, the Y component of the converted image signal at the YUV color coordinates in the first signal range.

8. The method of claim 7, wherein the compensation comprises, if the external image output device is a High Definition Multimedia Interface (HDMI) device or a Television (TV), compensating the Y component of the image signal at the YUV color coordinates such that the Y component is in the second signal range, and if the external image output device is not an HDMI device or a TV, maintaining the Y component of the image signal at the YUV color coordinates in the first signal range, and
further comprising outputting the compensated image signal at the YUV coordinates to the external image output device,
wherein the first signal range is 0 to 255 and the second signal range is 16 to 235.

9. The method of claim 8, wherein if the external image output device is an HDMI device, the outputting comprises simply outputting the image signal at the YUV coordinates received after the compensation to the external image output device, and if the external image output device is not an HDMI device, converting the image signal at the YUV coordinates received after the compensation into an image signal at Red, Green, Blue (RGB) color coordinates and outputting the image signal at the RGB color coordinates to the external image output device.

* * * * *